May 18, 1954  C. A. REIMSCHISSEL  2,678,825
GRIP
Filed Nov. 16, 1951

INVENTOR
CHARLES A. REIMSCHISSEL
BY Strauch, Nolan & Diggins
ATTORNEYS

Patented May 18, 1954

2,678,825

UNITED STATES PATENT OFFICE 2,678,825

GRIP

Charles A. Reimschissel, Waynesboro, Pa., assignor to Landis Machine Company, Waynesboro, Pa., a corporation of Pennsylvania Application November 16, 1951, Serial No. 256,648

7 Claims. (Cl. 279—7)

This invention relates to mechanisms for holding work pieces during machining operations and more particularly to apparatus for holding partially threaded pieces upon the threaded section thereof for further threading or other machining operations. Such mechanisms are used principally in the production of pipe nipples which, after being threaded on one end, are held by the threaded end while the second end is being threaded.

In prior hand operated threading machines the grips employed for holding the work piece are formed with a threaded recess having an integral plane bottom surface to insure that the nipple will remain stationary while the second end is being threaded. At the start of the second threading operation, the previously threaded portion of the work piece is screwed against the plane bottom surface of the threaded recess which prevents further axial and rotary movement of the work piece with respect to the grips.

The torque resulting from the operation of the cutting tools upon the unthreaded end of the work piece is sufficiently high so that the previously formed threads on the nipple are wedged tightly between the plane bottom surface of the grips and the flanks of the threads in the grip which are opposed to the bottom surface. Since these two wedging surfaces are parts of an integral member, no movement between them is possible and the finished work piece must be pried out of the threaded recess by mechanical means. This is often injurious to the product and, in any case, occupies time which might be used to seize the succeeding work piece for the next operation, with consequent serious reduction in quantity of output.

The mechanisms of the present invention remove this difficulty by providing a separate member to constitute the plane bottom surface of the grip. When the grips are closed, this member is held rigidly in position and thus is as effective as the integral bottom surface of the prior grips. When the grips are open, however, the wedging forces between the bottom surface and the opposed thread flanks are relieved, allowing the finished work piece to fall free. Thus no time is lost in removing the finished work piece from the grips, which, accordingly, are instantly ready for the insertion of the next work piece.

Accordingly, it is an important object of the present invention to provide novel mechanisms for gripping a work piece upon a threaded surface thereof to prevent the work piece from sticking in the grips when they are opened and to permit the finished work piece to be freely withdrawn.

It is another object of the invention to provide novel grips having a threaded recess whose plane bottom wall is formed by a member which is movable with respect to the remainder of the grips when the grips are in open position.

It is a further object to provide novel gripping mechanisms having a separable member which is held rigidly in position when the grips are closed upon a work piece and resiliently or loosely held when the grips are open.

Further objects and advantages will be apparent from the following description of the invention and the accompanying drawings in which.

Although a pipe nipple is shown as the work piece for purposes of illustration, the invention is not limited to such application. It may be used with any work piece having a thread at one end, whether that thread is straight or tapered and whether the additional operation to be performed is one of threading or some other.

With particular reference to the form of invention illustrated in Figures 1 to 4, a pair of grips 20 and 22 are held in operative position in the vise jaws 24 and 26, respectively, of a machine tool. The means for holding the grips 20 and 22 in this position forms no part of the present invention and may consist of screws 28 and 30 threadedly engaged in the outward sides of the opposed grips 20 and 22. It is well understood in the art that the vise jaws 24 and 26 will be provided with some known means for causing one or both of them to be reciprocated laterally to effect the alternate seizing and releasing of a work piece. Such means forms no part of the invention and is not illustrated.

Figure 1:
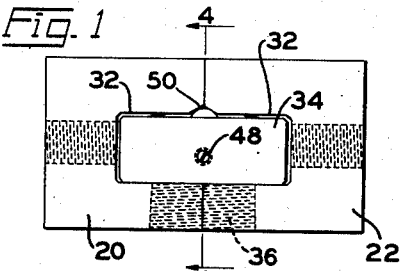
Figure 1 is a top plan view of a gripping mechanism constructed according to the invention.
Figure 2:
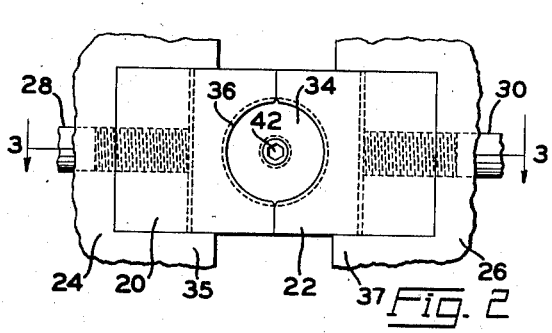
Figure 2 is a front elevation thereof showing the grips positioned in a conventional mount.
Figure 3:
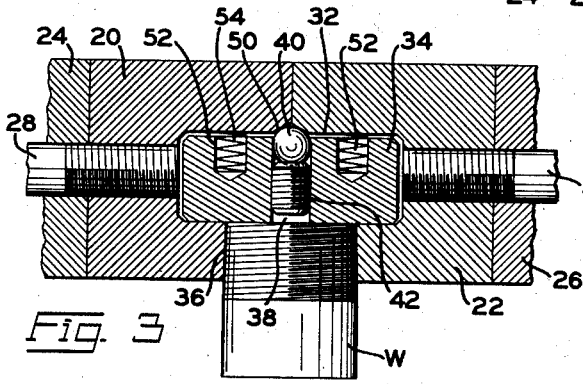
Figure 3 is an enlarged sectional view taken along line 3—3 of Figure 2 and showing a workpiece in position.
Figure 4:
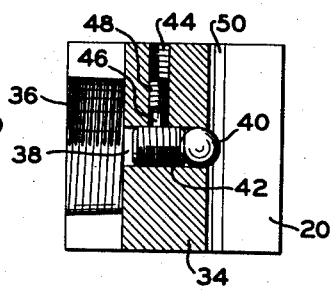
Figure 4 is a similarly enlarged sectional view taken along line 4—4 of Figure 1.

As seen in Figures 1 and 3, each of the pair of grips 20 and 22 is approximately U-shaped, having its inwardly facing surface recessed as at 32. Thus, when the grips are closed, the opposed recesses 32 meet to form an open rectangle which is occupied by a loosely fitting rectangular block 34 of substantially the same height as the grips 20 and 22. Block 34 is supported within grips 20 and 22 by lips 35 and 37 formed integrally with the respective jaws 24 and 26.

When closed, grips 20 and 22 present a threaded bore 36 in their forward faces which threaded bore is formed to correspond in diameter and pitch to the thread on the work piece W to be held. However, this threaded opening 36 is made just enough larger than the work piece to permit the work piece under the influence of the torque of the cutting operation to screw itself rearwardly against the forward surface of the block 34.

The block 34 is provided with a tapped hole 38 extending therethrough from front to rear and having the threads removed adjacent the rear surface thereof for the reception of a ball 40. The rearward edge of the opening 38 is peened to prevent the escape of the ball 40 at that end. A set screw 42 is threadedly engaged in the forward end of hole 38 to provide a precise adjustment of the forward travel of the ball 40. A second tapped hole 44, perpendicular to and communicating with the hole 38, is formed in block 34. The tapped hole 44 receives a plug 46 (Fig. 4) and a set screw 48, these parts being used to lock the set screw 42 in adjusted position.

Bevels 50 are provided at the intersection of the rearward surface of the recess 32 and the inwardly facing, opposed surfaces of both grips. These bevels 50 engage the ball 40 which protrudes from the opening 38 and, when the grips are closed, force the block 34 rigidly against the forward surface of recess 32 to provide a firm bottom surface for the work holding opening 36. Recesses 52 are provided in the rearward surface of block 34 to receive compression springs 54. Thus, by the interposition of springs 54 between block 34 and the rear wall of recess 32, block 34 is resiliently urged forwardly against the forward surface of recess 32, when the grips are in open position and ball 40 is not engaged by the beveled surfaces 50.

Figure 7:
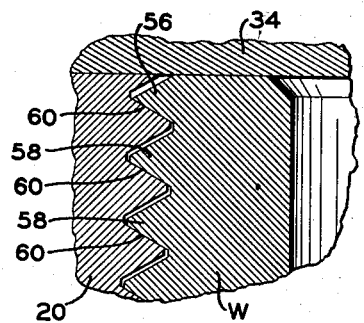
Figure 7 is an enlarged fragmentary detail view of a portion of Figure 3 illustrating the wedging action between the grips and a work piece.

Figure 7, an enlarged portion of Figure 3, shows the threaded end of the work piece W in position in the grips 20 and 22. The work piece W has a terminal thread portion 56 and other thread ridges 58. During the course of a cutting operation upon the end of the work piece projecting from the grips, the torque is applied to rotate the work piece into the grips. Because of this torque the terminal thread portion 56 is immediately tightly wedged between the forward surface of block member 34 and the oppositely facing flank surfaces 60 of the thread grooves in the grips 20 and 22.

In prior constructions, these opposing surfaces were integral parts of the same member. That is, the work-holding recess was formed in a pair of grips, so that, in each grip, the plane bottom surface of the recess and the thread flanks were formed in the same piece of metal. As a result, when the grips were opened it was usually necessary to pry the work piece from one or the other of the grips, with consequent loss of production time and possibility of damage to the work.

Referring again to Figure 7, it will be seen that in the present invention, the forward surface of block 34, constituting the bottom surface of the work-receiving recess, is rigidly held in position while the machining operation is carried out, but is supported resiliently when the grips are separated. Thus, the work piece is permitted to move a slight distance rearwardly, relieving the wedging action between block 34 and surfaces 60 and allowing the work piece to be removed very easily or to freely drop out of position if desired. As best shown in Figures 1 and 3, the thickness of the block member 34 is made slightly less than that of the recess 32 to allow for such movement of the work piece when the grips are opened.

The above-described mechanism for adjusting the position of ball 40 is used to establish the position of the forward surface of block 34 when the grips are closed. This position is preferably selected so that there is actual contact between the block 34 and the forward wall of recess 32 although this is not essential. It will be noted that adjusting the ball 40 to protrude too far would not permit the grips to close completely and this should be avoided.

Figure 5:
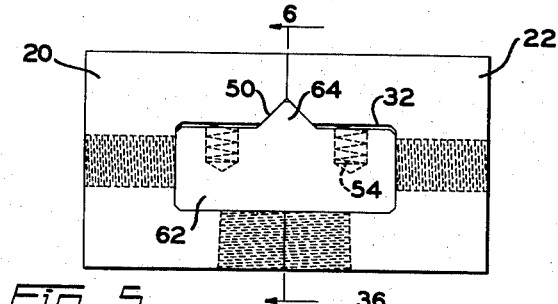
Figure 5 is a plan view of a modified form of the invention.
Figure 6:
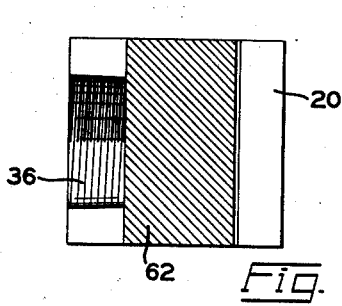
Figure 6 is a sectional view taken along line 6—6 of Figure 5.

A simplified modification of the device of the invention is shown in Figures 5 and 6. This embodiment differs from that of Figures 1 and 4 by the elimination of the ball 40 and its adjustment. Instead of the ball, block member 62, which is positioned between grips 20 and 22 in the same manner as block 34, has a V-shaped vertical ridge 64 formed on its rear surface for engagement by the beveled surfaces 50. This modification has the same mode of operation as that previously described except that the closed position of block 34 is not adjustable and is somewhat more subject to wear.

It is possible to operate the device without the springs 54, in which case the block 34 or 62 will be held very loosely on lips 35 and 37 when the grips are opened but the work-piece will nevertheless be released in the same manner. The presence of the springs 54 is preferable, however, in order to keep the space between the forward surfaces of block 34 or 62 and recess 32, as small as possible to avoid the entrapment of dirt, chips and other debris therebetween.

Thus, the device of my invention at no sacrifice of strength or range of application of the grips and at very little increase in cost, makes possible the production of work pieces of improved appearance with a substantial saving in overall production time and cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A gripping mechanism for a partially threaded work piece comprising; a pair of opposed grips relatively movable between open and closed positions and having mating opposed recesses; mating threaded portions on each of said grips having threads corresponding to the threads on said work piece; a member positioned loosely in said recesses, said member having a surface normal to the axis of said threaded portions and disposed adjacent the inner end thereof; and cooperating means on said grips and said member operable in response to movement of said grips to said closed position to urge said surface of said member toward the inner end of said threaded portions and to permit the movement of said surface away from said threaded portions in response to movement of said grips to said open position, whereby the work piece is positively held in said threaded portions when said grips are closed, and may be freely withdrawn when said grips are opened.

2. A gripping mechanism for a partially threaded work piece comprising a pair of opposed grips movable between open and closed positions; means in said grips providing a threaded recess having threads corresponding with the threads on said work piece; a member loosely received in said grips having a surface normal to the axis of said recess and adjacent the inner end thereof; and means responsive respectively to closing and opening movements of said grips to selectively urge said member toward said recess and permit its movement away from said recess to selectively wedge a work piece positioned in said recess against the threads of said recess and relieve said wedging action to permit the free withdrawal of said work piece.

3. A gripping mechanism for a partially threaded work piece comprising; a pair of separable grips movable between open and closed positions, said grips having opposed mating semicylindrical threaded recesses and enlarged substantially U-shaped recesses formed at the inner end of said threaded recesses; a member adapted to be loosely received in said U-shaped recesses, said member having a plane surface normal to the axis of said threaded recesses; and cooperating means on said member and said grips for moving said plane surface of said member to a predetermined position with respect to the inner end of said threaded recesses in response to movement of said grips to said closed position.

4. The gripping mechanism of claim 3, together with means to adjust said predetermined position.

5. A gripping mechanism for a partially threaded workpiece comprising; a pair of opposed grips movable between open and closed positions; means in said grips forming a threaded recess into which a workpiece may be inserted; a member loosely received in said grips and having a plane surface adapted to provide a bottom wall for said recess; and means forming cooperating surfaces on said grips and said member operable in response to movement of said grips to said closed position to urge said surface toward one end of said recess and operable in response to movement of said grips to open position to permit free movement of said member away from the end of said recess to permit free withdrawal of said workpiece from said grips.

6. A gripping mechanism for a partially threaded work piece comprising; a pair of grips movable between open and closed positions, said grips having opposed mating substantially U-shaped recesses and opposed mating, semi-cylindrical recesses provided with threads corresponding to the threads of said work piece; a member loosely received in said U-shaped recesses and having a plane surface normal to the axes of said threaded recesses, said member also having a central aperture parallel with the axis of said threaded recesses; an element received in said aperture and adapted to protrude from one end thereof; mating wedging surfaces on adjacent faces of said grips adapted in response to movement of said grips to said closed position to engage said element and force said element and said member toward the inner end of said threaded recesses to wedge the threads of said work piece against the threads of said recess to prevent rotary and axial movement of said work piece with respect to said grips.

7. A gripping mechanism for a partially threaded workpiece, comprising; a pair of grips movable between open and closed positions, said grips having opposed mating substantially U-shaped recesses and opposed mating semi-cylindrical recesses provided with threads corresponding to threads of said workpiece; a member loosely received in said U-shaped recesses, said member having a plane forward surface normal to the axes of said threaded recesses, and having a projection on its rear surface; mating wedging surfaces on adjacent faces of said grips adapted to engage said projection and force said member toward the inner end of said threaded recesses to wedge the threads of said workpiece against the threads of said recess to prevent rotary and axial movement of said workpiece with respect to said grips.

References Cited in the file of this patent

UNITED STATES PATENTS

| Number | Name | Date |
| --- | --- | --- |
| 1,169,961 | Jadin | Feb. 1, 1916 |
| 1,772,953 | Lilleberg | Aug. 12, 1930 |
| 2,598,423 | Pealer | May 22, 1952 |